(12) United States Patent
Spira et al.

(10) Patent No.: US 7,406,431 B2
(45) Date of Patent: **\*Jul. 29, 2008**

(54) PLANT MAINTENANCE TECHNOLOGY ARCHITECTURE

(75) Inventors: Mario Cosmas Spira, Erlangen (DE);
Erich Niedermayr, Vaterstetten (AT);
Günter Menden, Heroldsbach (DE);
Hans Klemme-Wolff, Dietikon (CH);
Bernhard Sommer, Vienna (AT); Jörg Tautrim, Beckingen (DE)

(73) Assignee: Siemens Aktiengesellschaft, Munich (DE)

( \* ) Notice: Subject to any disclaimer, the term of this patent is extended or adjusted under 35 U.S.C. 154(b) by 942 days.

This patent is subject to a terminal disclaimer.

(21) Appl. No.: 09/979,910

(22) PCT Filed: Mar. 14, 2001

(86) PCT No.: PCT/IB01/00694

§ 371 (c)(1),
(2), (4) Date: Nov. 14, 2001

(87) PCT Pub. No.: WO01/69417

PCT Pub. Date: Sep. 20, 2001

(65) Prior Publication Data

US 2002/0161614 A1    Oct. 31, 2002

(51) Int. Cl.
*G06O 10/00*    (2006.01)
(52) U.S. Cl. .............................................. 705/7; 705/8

(58) Field of Classification Search ............... 705/8–10, 705/7
See application file for complete search history.

(56) References Cited

U.S. PATENT DOCUMENTS

| | | | | |
|---|---|---|---|---|
| 5,216,612 A | \* | 6/1993 | Cornett et al. | 700/96 |
| 5,311,562 A | \* | 5/1994 | Palusamy et al. | 376/215 |
| 5,687,212 A | \* | 11/1997 | Kinser et al. | 379/9.03 |
| 6,301,339 B1 | \* | 10/2001 | Staples et al. | 379/93.01 |
| 6,317,701 B1 | \* | 11/2001 | Pyotsia et al. | 702/188 |
| 6,356,437 B1 | \* | 3/2002 | Mitchell et al. | 361/683 |
| 6,421,673 B1 | \* | 7/2002 | Caldwell et al. | 707/10 |
| 6,560,222 B1 | \* | 5/2003 | Pounds et al. | 370/353 |
| 6,873,949 B2 | \* | 3/2005 | Hickman et al. | 704/9 |
| 2002/0030604 A1 | \* | 3/2002 | Chance et al. | 340/870.09 |

OTHER PUBLICATIONS

Bird, Paul, "Single Source Maintenance", Sep. 1993, Purchasing and Supply Management, Easton-on-the-Hill, p. 41, ProQuest ID 1393448.\*
Tatum, Rita, "Online, all the time", Jan. 1999, Building Operations Management, vol. 46, Iss. 1, p. 31, 4 pages, ProQuest ID 38108414.\*
Schimoller, Brian K, "Outsourcing plant maintenance", Feb. 1998, Power Engineering, v102n2, pp. 16-22, Dialog 01594278 02-45267.\*

(Continued)

*Primary Examiner*—Beth Van Doren
*Assistant Examiner*—Jonathan G Sterrett
(74) *Attorney, Agent, or Firm*—Schiff Hardin LLP

(57) ABSTRACT

An overall plan for providing maintenance and technical services for businesses and plants, as broadly defined, includes generic procedures for the services written as a manual of standard practices. A knowledge base or experience database of data and people is utilized, and both hardware and software tools are selected and used in providing the services.

14 Claims, 13 Drawing Sheets

OTHER PUBLICATIONS

"Partner to Compete", Mar. 1999, Transmission and Distribution World, Dialog 04150887 54417559.*

Laios, Lambros, "An Empirical investigation of outsourcing decisions", Winter 1999, Journal of Supply Chain Management, vol. 35, Iss. 1, p. 33, ProQuest ID 39247590.*

Dunn, Richard L., "Exploring Outsourcing", Mar. 1999, Plant Engineering, vol. 53, Iss. 3, p. 123, ProQuest ID 39627191.*

Venkatraman, N, "Beyond Outsourcing: Managing IT Resources as a Value Center", Spring 1997, Sloan Management Review, pp. 51, 38, 3, ABI/Inform Global.*

DiRomualdo, Anthony; Gurbaxani, Vijay, "Strategic Intent for IT Outsourcing", Summer 1998, Sloan Management Review, pp. 67, 39, 4, ABI/Inform Global.*

Monnier, Jean-Baptiste; Coe, Andy; Camateros, Styli; Komblith, Mike, et. Al, "Viewpoints Q/A: 'How will technology impact the world's ambitious global infrastructure goals in the next century?'", Fourth Quarter 1998, MicroStation World, vol. 4, Iss. 4, p. 18.*

Avery, Susan, "AMR lands the medal!", Sep. 15, 1998, Purchasing, vol. 125, Iss. 4, p. 36, ProQuest ID 34153381.*

Hoplin, Herman P; Hsieh, George S.; "Outsourcing/Rightsizing for the 1990's ", 1993, Industrial Management + Data Systems, vol. 93, Iss. 1, p. 18, ProQuest ID 1115687.*

Ireland, Paul, "Satisficing dependent customers: on the power of suppliers in the IT systems integration supply chains", 1999, Supply Chain Management, vol. 4, Iss. 4, p. 184, ProQuest ID 86923247.*

"Siemens—a world class maintenance provider Siemens Metals, Mining & More", Nov. 1996, 2nd Edition, p. 4.*

"Cost Savings through integral plant maintenance", Aug. 1, 1997, ABIX/LexisNexis Australia, Electrical World, p. 6.*

"Siemens Maintenance Increases Productivity at Australian Paper", Erlangen, Apr. 20, 1999, pp. 1-2.*

"Siemens Integral Plant Maintenance", © 1996, Siemens.com.au website from web.archive.org, Jun. 26, 1997, p. 1.*

"Siemens Industrial Systems & Technical Services", © 1996, Siemens.com.au website from web.archive.org, Feb. 11, 1997. p. 1.*

"Siemens Technical Services Department—workshops", © 1996, Siemens.com.au website from web.archive.org, Jun. 26, 1997. p. 1.*

"Siemens Technical Services Department—engineering", © 1996, Siemens.com.au website from web.archive.org, Jun. 26, 1997. pp. 1-2.*

"Siemens Technical Services Department—Field Services and Repair Center", © 1996, Siemens.com.au website from web.archive.org, Jun. 26, 1997. p. 1.*

"Siemens Technical Services Department—Projects and Installations", © 1996, Siemens.com.au website from web.archive.org, Jun. 26, 1997. p. 1.*

"Siemens Technical Services Department—Condition Monitoring Services", © 1996, Siemens.com.au website from web.archive.org, Jun. 26, 1997. pp. 1-2.*

"Siemens Technical Services Department—Industrial Systems", © 1996, Siemens.com.au website from web.archive.org, Jun. 26, 1997. pp. 1-2.*

"Cost Savings through Integral Plant Maintenance", Aug. 1997, Electrical World (published in Australia), v.62, No. 7, p. 6.*

"Bessere Instandhaltung durch Maintenance Information Management" by Joachim Lauer and Michael Strauss, from Publication Engineering & Automation, 15 (1993)—English Translation attached.

"Moderne Instandhaltung: ganzheitlicher Service vom Produkt bis zur Anlage" by Michael Fleck published in Engineering & Automation 17 (1995). English translation attached.

"Outsourced Maintenance and Operations" by Anthony Hadakas in Iron and Steel Engineer, Apr. 1998—Article in English.

Bird, Paul, Single Source Maintenance, Purchasing & Supply Management, Easton-on-the Hill, Sep. 1993, p. 41, 2 pgs.

* cited by examiner

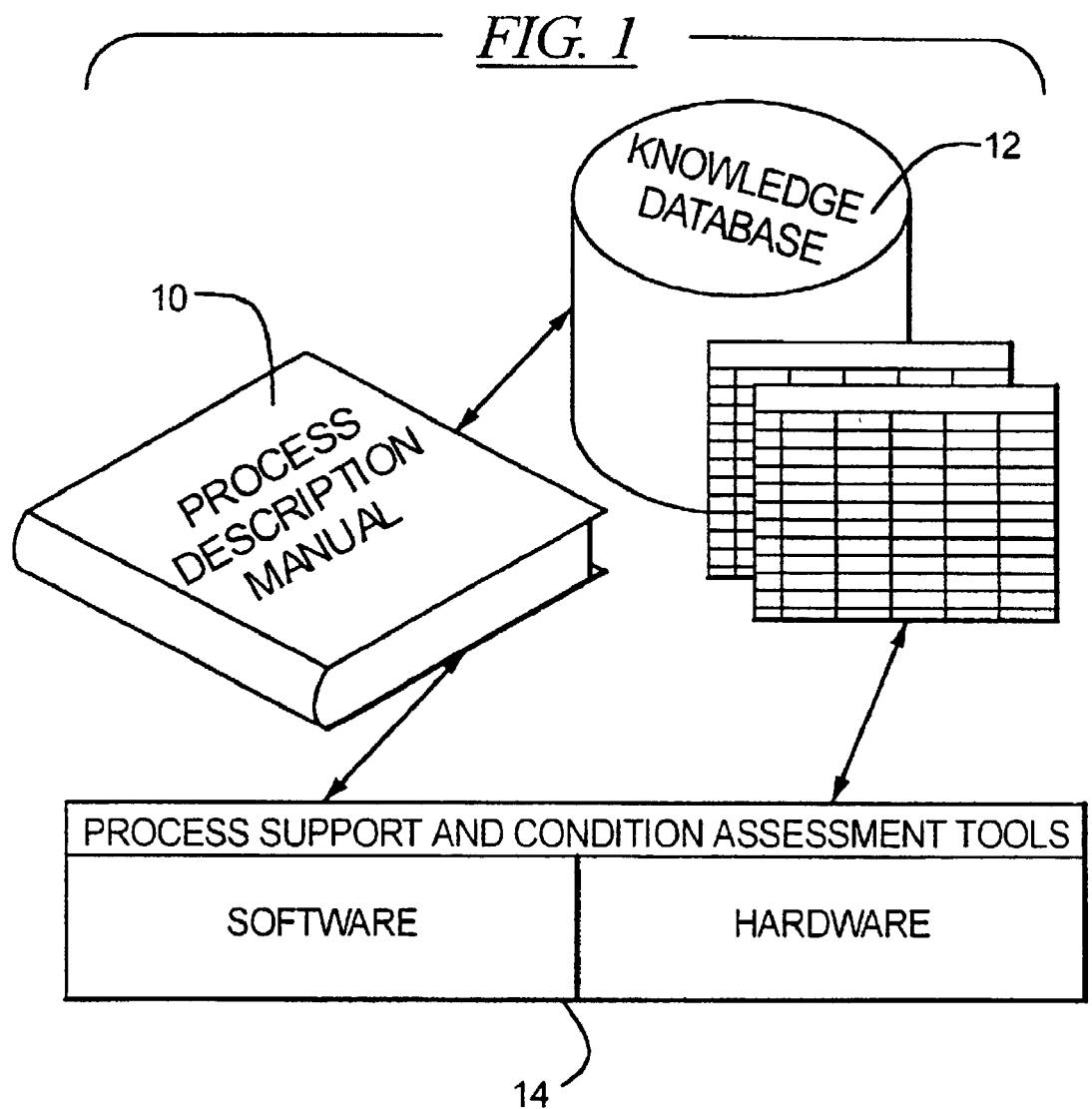

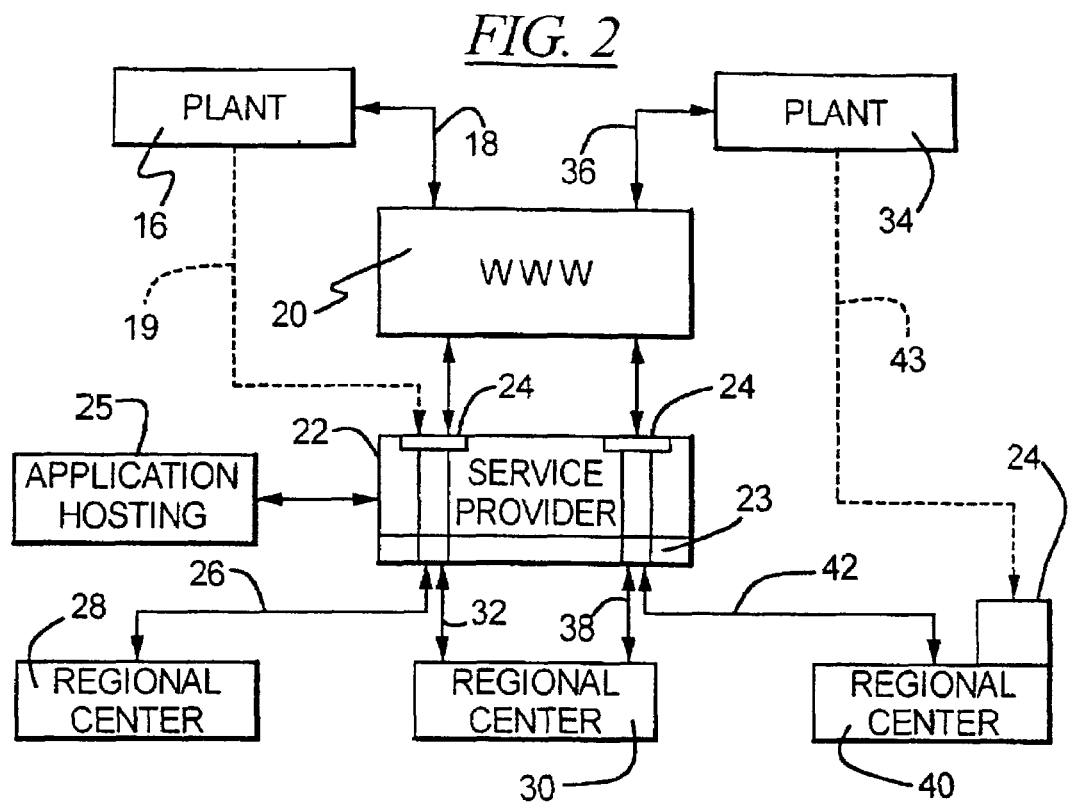
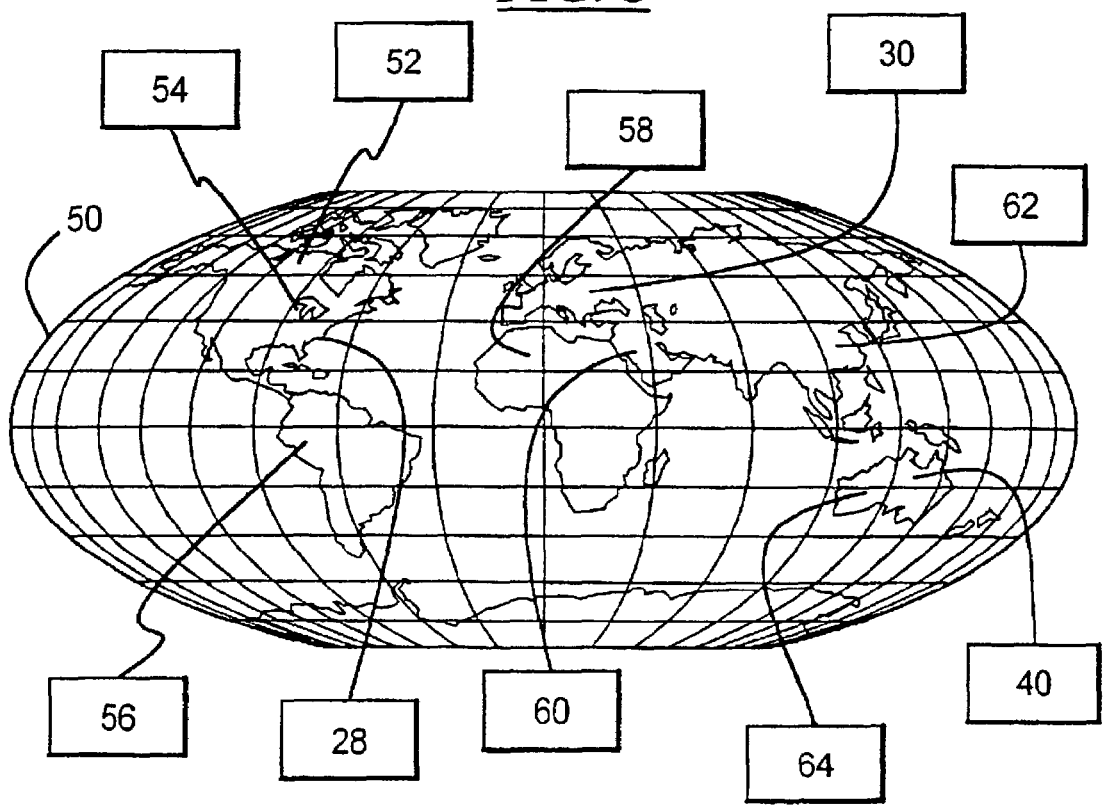

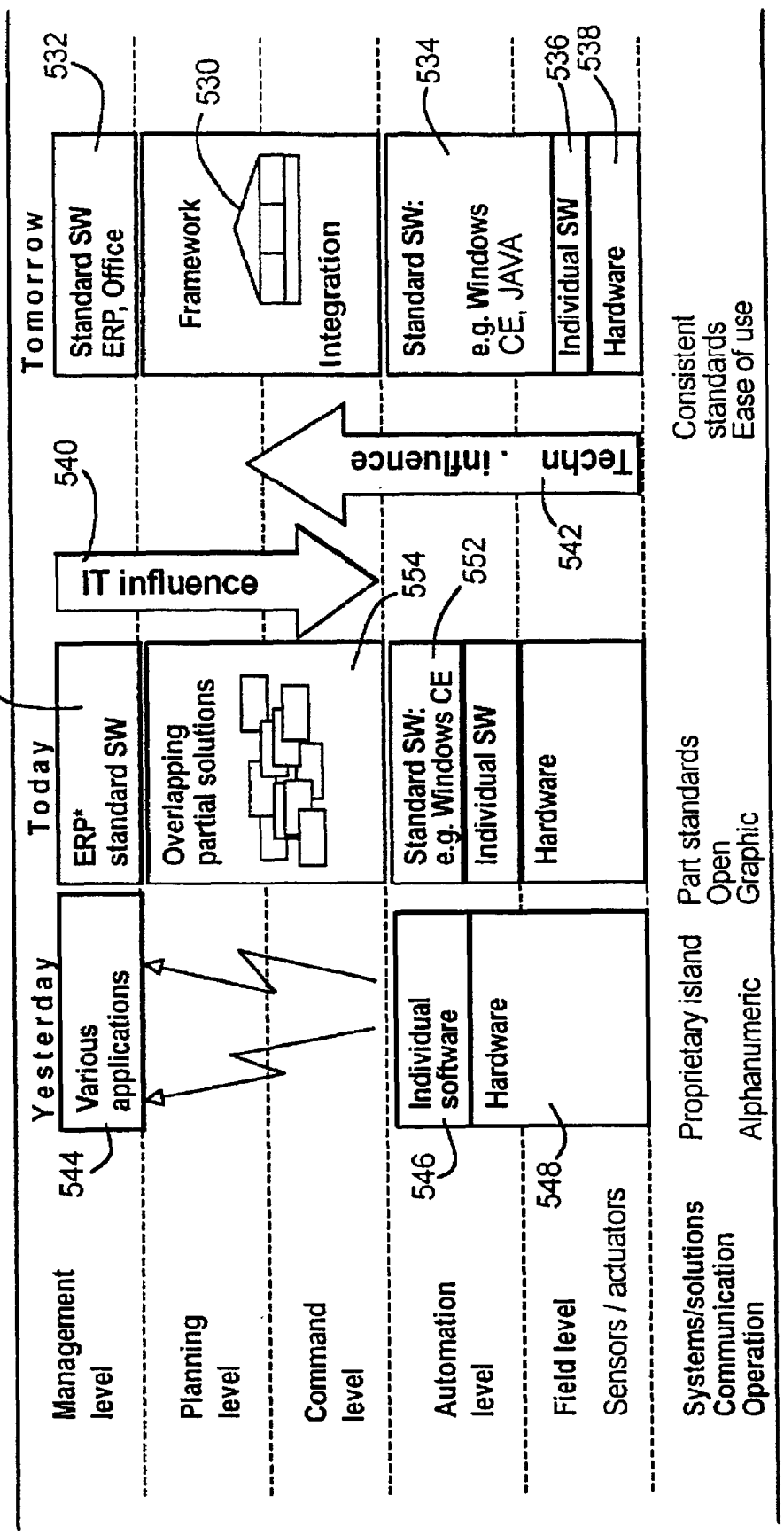

PLANT MAINTENANCE TECHNOLOGY ARCHITECTURE

TECHNICAL FIELD

The present invention relates generally to a method of applying and/or improving maintenance services to plants, including describing providing maintenance to plants potentially on an outsourced basis at all stages in the plant life cycle.

BACKGROUND ART

As global competition increases and supply chains become shorter, businesses are being forced to find new ways to increase plant performance while simultaneously reducing costs. Complexity of the business adds to the costs, and one area of significant complexity for manufacturing businesses is plant maintenance. In addition to adding complexity, maintenance can make up anywhere from 5-40% of the total costs of production. While maintenance is critical to the business outcome, it is often regarded as a necessary evil, and as a result it has been difficult to achieve sustained improvement in performance from an in-house maintenance group without intense management effort that detracts from the core business process.

For complete plants or, for example, production lines, it is known to provide (under classic maintenance contracts) fixed prices for a qualified status of the production means. The qualified availability is determined by the customer on the basis of his experience (which availability he must have).

Furthermore, bonus/penalty maintenance service is known; an availability variable is thereby determined (90%, 95%, 98%, 100%). If a better availability or 100% is reached, a bonus is paid; if less is reached, there is a penalty incurred.

According to the prior art, the following maintenance services, for example, are being done for the customer: Personnel, repair service/exchange service, partially including stock keeping, software update or suchlike.

The previously described prior art is not the best for the customer. The customer needs the financially, organizationally and technically best solution.

DISCLOSURE OF THE INVENTION

An objective of the present invention is to provide a definition and implementation of methods and tool systems to deliver value-added and integrated plant maintenance.

The present invention provides a collection of operative business and maintenance processes in a comprehensive and merged description, referred to here as a manual. The present invention also provides guidelines as well as an architecture for selecting and integrating software and hardware tools and resources to perform the process steps outlined in the manual. This includes identifying and providing best-in-class software. Resources include consultants and cooperation partners. A further aspect of the invention is to provide an experience database, termed a knowledge database or repository that includes data tools and people which are consulted either occasionally or constantly for guidance. The knowledge base includes data from project experience, regional business information, data relating to technical equipment, cost models and the like. This knowledge base forms a plant maintenance repository of historical data that is consulted for predictions of plant events, system and component failure modes and events. By consulting the knowledge base, the maintenance of the plant is optimized based on market demands and historical records.

The modules, which are implemented through software modules and hardware, are installed at a local level in each plant. However, operation and control of the service is provided through regional facilities that are linked to the local facilities by a communication connection, such as through the Internet. The regional facilities are provided at regions around the globe so as to offer 24 hour support to the local service locations, including providing a regional center in the Far East, one in the European Union, and one in a NAFTA country. One of these regional centers are open during business hours at any time of the day to provide support for the local service locations. The regional centers are in turn connected via communication links to a single world-wide headquarters.

The local installation of the software is determined by what is available locally that meets the established criteria. This provides a local flavor or local color for the software, so long as it falls in the desired class or group of software tools. For instance, a local word processor program in the native language of te country may be used as a local implementation of the tools. The tools need only meet the integration requirements established by the present inventory as a world side strategy.

The process descriptions provided by the manual bring visibility to the support strategies of a business so that priorities may be assigned. Interfaces become transparent and experience in one region can be used in another A continuous improvement process may be undertaken. By exchanging experience, best practices sharing can be performed so that every unit works according to the same and/or optimum rules.

Additional aspects of the invention provide written strategy and methods, understanding of know-how based on business processes and know-how based on technical processes, and integration and piloting.

Thus, the present invention provides a manual of uniform or standardized practices relating to technical services for use by plants and facilities to achieve reduced costs, greater efficiency, and higher profits. The manual is utilized along with a database of experience through secure communications channels to the plant or facility for added benefits. Software and hardware are utilized in combination, and together with the manual and experience database yields optimum financial results.

The present invention is utilized along with outsourced technical services and maintenance technology provided to plants as a part of a business strategy. According to the present invention, plants are defined broadly to include airports, steel mills, hospitals, mines, ship yards, large buildings, hotels, chemical plants, cement plants, subway systems, railway systems, container terminals, oil drilling rigs or platforms, paper mills, oil or natural gas pipeline systems, lime plants, water treatment plants including desalination, fresh water pipelining and waste water treatment, food service facilities, etc.

These services are provided at all phases in a plants life cycle, including planning of the plant, erecting the plant, mobilizing and operating the maintenance of plant and managing the shut down of the maintenance services on the plant.

The outsourced services are founded on a knowledge base comprising experienced personnel and business plans shown to have been effective, as well as of gathered historical data An implementation of the present invention is embodied in a technical support program featuring modular services offered via a menu of services to plants. A more specific aspect of the invention is embodied in a motor management program featuring modular motor services offered via a menu to plants. Both of these are covered in more detail in PCT applications by the present assignee, which are incorporated herein by reference. A further aspect of the invention is embodied in a menu driven management and operation technique, for which an application is being filed by the assignee of the present invention and which is incorporated herein by reference.

The present invention provides the manual as a presentation layer for presenting information on the maintenance architecture to guide and assist personnel of the services provider.

Thus, the present invention proposes a better solution for the customer, particularly to improve its financial plant result (its profit). For this purpose, the availability is adapted to the requirements of the production process, of the market, etc. (an ice factory does not need a high availability in the winter, for example; the same is valid for a gift shipping company directly after Christmas). As a result of PMTA, an optimal solution is possible for the customer given minimal costs of the individual service process, so that a particularly low service price can be offered to the customer despite a permanent availability of the service. This is his advantage.

BRIEF DESCRIPTION OF THE DRAWINGS

FIG. 1 is a schematic illustration of the main elements of the present invention, including a process manual incorporating the practices and process of the present invention, knowledge base and tools set;

FIG. 2 is a functional block diagram of communications between plants and regional centers;

FIG. 3 is a diagram of the world indicating plant and regional center locations;

FIG. 14 is a time and organization level diagram comparing the present invention to prior arrangements.

MODES FOR CARRYING OUT THE INVENTION

Figure 4:
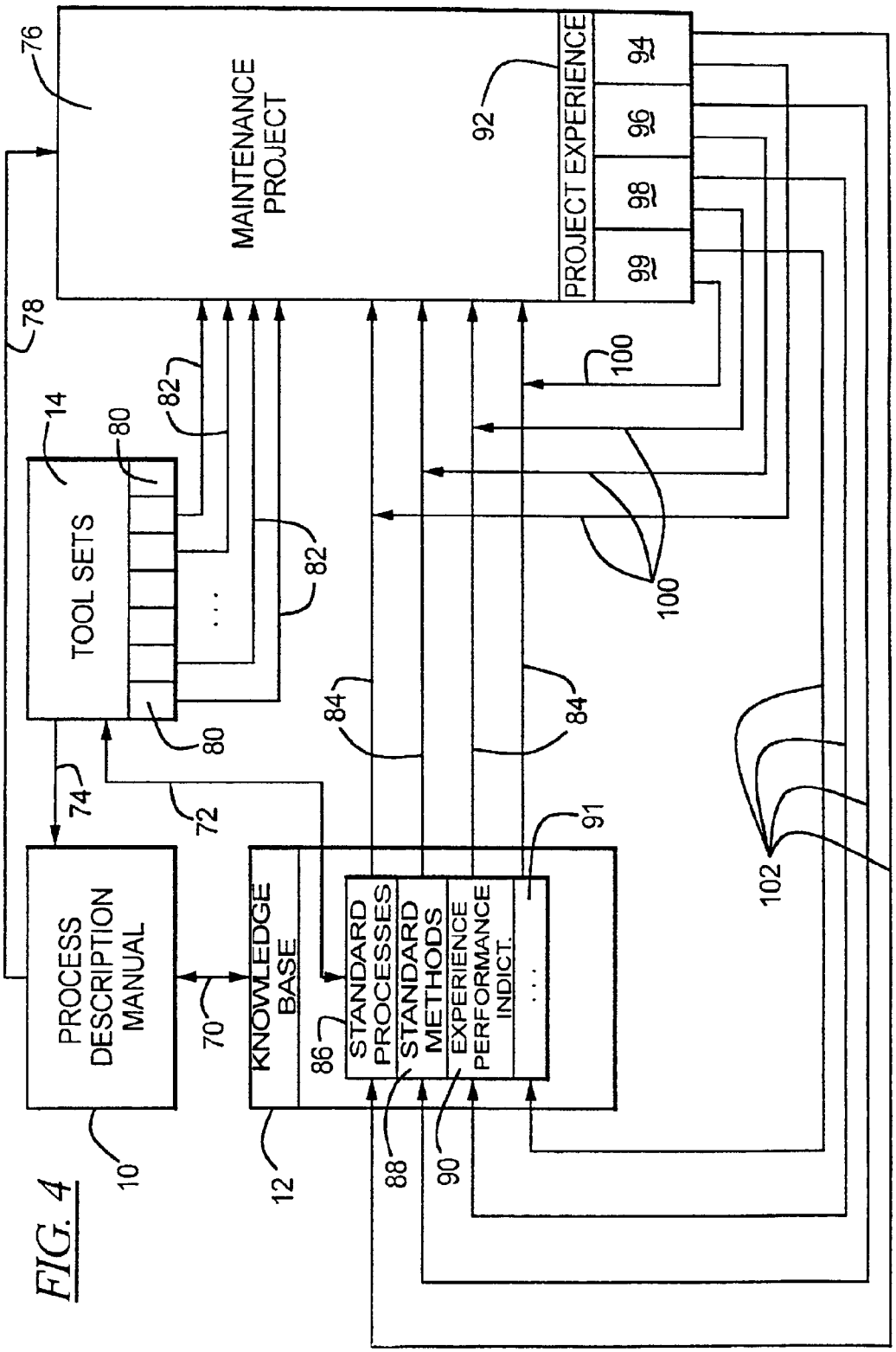
FIG. 4 is a functional block diagram of the main elements of the invention being utilized in a maintenance project.

According to FIG. 1, the present invention provides an architecture, including as primary elements a process description manual 10, a knowledge database 12 and hardware and software tools 14, for providing maintenance services to plants and facilities. The process description manual 10, the knowledge base 12 and the tool set 14 are all interlinked to one another as indicated by the arrows. This relationship will be discussed in further detail hereinafter.

The manual 10 of the present invention may be presented in a variety of forms, including on paper, electronically, via a network connection such as the World Wide Web, or on various computer media such as disks, tape or optical media. The present architecture provides a view to maintenance services as an aspect of the business effecting the bottom line of the plant, which is outlined in the manual 10. The present architecture considers maintenance services from a global view, from a regional view and from a local view.

Experience on a global and regional scale is gathered in the knowledge database 12 and used to increase bottom line profits at the local plant. The database 12 includes not only data but also experts on various maintenance issues, and these experts are made available on a regional basis for the local plants.

The tool set 14 includes both process support tools and condition assessment tools for the maintenance services, and these may include both software and hardware tools. These are chosen utilizing shared information from the global and regional information found in the manual 10 and the database 12, so that a best of class tool set is made available at the local level via a stand alone application, a server-based network connected application or via a web-based ASP (application service provider).

FIG. 2 shows the communications channels between plants at which maintenance services are being provided and regional centers of expertise, which serve as repositories for the knowledge base, as provided according to the present invention. A plant 16 is a customer located in a first country of the world. The plant 16 is a plant according to the broadly defined term that includes airports, steel mills, hospitals, mines, ship yards, large buildings, hotels, chemical plants, cement plants, subway systems, railway systems, container terminals, oil drilling rigs or platforms, paper mills, oil or natural gas pipeline systems, lime plants, water treatment plants including desalination, fresh water pipelining and waste water treatment, food service facilities, etc.

A communication channel 18, either by wire or wireless, connects the plant 16 to a network 20, such as the Internet, and specifically the World Wide Web of the Internet. The plant 16 has access through the World Wide Web 20 to a maintenance service provider 22 which provides outsourced maintenance services to the plant 16. Preferably, a firewall 24 is provided at the communication channel to ensure security of data behind the firewall. The communication channel is carried through the service provider by a channel 26 to a center of expertise 28 located in a first region. The first region is the region of the world in which the country of the plant 16 is located. The plant 16 is able to obtain expert advice and guidance in maintenance issues by consulting with the experts and others at the center 28. The experts and others at the center 28 have at hand the data of the knowledge database 12 which is consulted as a guide.

The connection channels between the elements of FIG. 2 are preferably secure connections, such as by utilizing encryption and/or other security measures. As an alternative, the communication channel between the plant 16 and the service provider 22 may be by a dedicated phone line or internal network connection, as indicated at 19. This dedicated connection 19 is through the firewall 24 for security reasons.

The plant 16 has the tools 14, both hardware and software, for carrying out the maintenance services at the plant. In some instances, the software tools may not be installed in the plant 16, but can be accessed over the network connections. The service provider 22 performs the function of application hosting, as shown at 25. The service provider 22 has at hand the process manual 10 on which the maintenance architecture is based, and the plant 16 and regional center 28 may also have the process manual 10.

The center 28 may not always be available, however, since it may be after working hours at the regional center 28. In this case, the inquiry from the plant 16 is forwarded to a second regional center 30 through a communication channel 32. The second center of expertise 30 is located in a different region of the world than the first center 28, and so is still open during its working hours. The customer 16 need not know that the second center 30 is being accessed, however, since the communication channel 32 is selected by the service provider 22 based on regional center availability.

A second plant 34 in a different country also has maintenance services provided by the service provider 22. The plant 34 consults with a regional center of expertise 30 in the second region of the world so long at the center 30 is open (on duty) and available. The communication channel includes a wired or wireless link 36 through the World Wide Web 20 and through the firewall 24 of the service provider 22 to the center 30 by a communication channel 38. If the center 30 is on duty, the inquiry is answered or the assistance is provided. However, the center 30 may no longer be on duty, so that the service provider 22 forwards the support inquiry to a third regional center 40 through a communication channel 42. As a further alternative, the plant 34 may have a direct connection 43 to the regional center 40 and so bypass the service provider 22. It is preferred in this instance to provide the regional center 40 with a firewall 24 for security.

The function of redirecting the inquiry is transparent to the plant making the request and is handled by a directory layer 23 within the service provider 22. Every center of expertise need not have the same information or expert personnel available, and so the directory layer 23 is also used to redirect inquiries to the center having the needed expertise. Multiple centers of expertise may be provided within each region, if desired. Plants in many different countries have a center for expertise available to them whenever help is needed.

In FIG. 3 is shown the world 50 indicating the locations of the regional centers 28, 30 and 40, for example. The locations of plants around the world are shown, including plants 52, 54 and 56 in a region belonging to the regional center 28, plants 58 and 60 in the region of the center 30, and plants 62 and 64 in the region of the center 40. Thus, each region of the world is covered by a regional center, and if a local center for a particular plant is off duty, another center in another region of the world is on duty and takes the inquiry. Continuous service is therefore provided 24 hours per day, in all time zones of the world, but without requiring 24 hour staffing at any one center.

According to FIG. 4, an execution of the maintenance is shown including the process manual that includes reference links 70 to the knowledge database 12. The knowledge base has data and process links 72 to the tools 14, and the tools 14 provide reference links 74 back to the process manual 10. The manual 10 leads to the application of the concepts to a maintenance project 76 at a plant as shown at 78. The tools 14 include individual tool elements 80 that are applied to the maintenance project 76 as indicated at 82. The maintenance project 76 is in a specific region and has specific content and is in a specific industry. Performing the maintenance project 76 requires providing initial information, which comes from the knowledge base 12 as indicated at 84. These various leads indicate the input of standard processes 86, standard methods 88, key performance indicators 90, and further information 91. The processes 86 are generally high level and include a sequence of actions to goal, while the methods are a low level and are components of the processes, generally being analytical. The further information 91 includes information illustrated and discussed in conjunction with FIG. 11.

Figure 11:
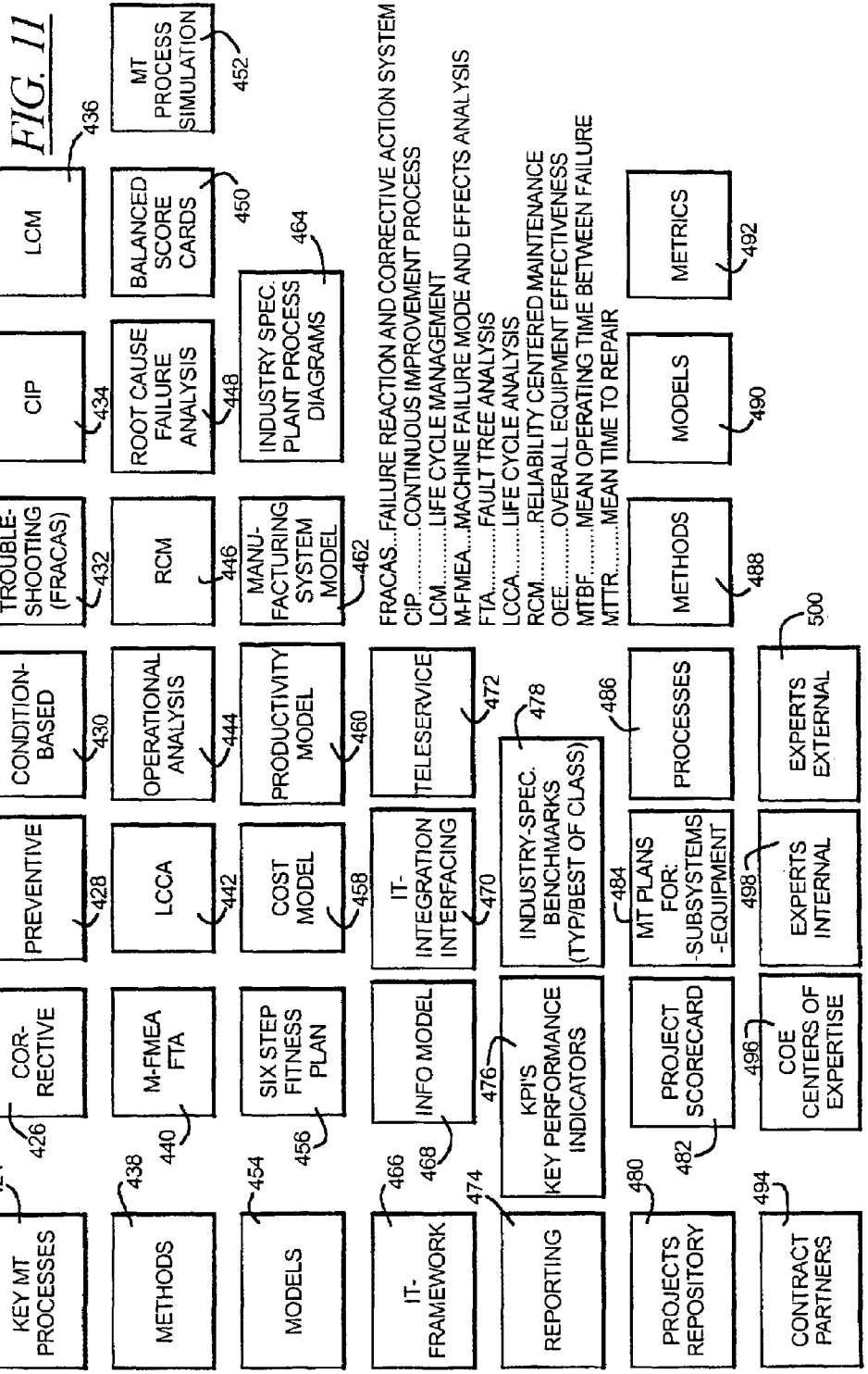

After the maintenance project 76 is running, project experience is gained, as shown at 92, The experience leads to improvements in the processes 94, methods 96, performance indicators 98 and the further information 99 (see FIG. 11). These improvements are fed back as shown at 100 to the maintenance project 76. The improvements resulting from the experience 92 are also fed back to the knowledge base 12 and applied to the corresponding parts thereof, as indicated at 102. The knowledge base 12 is thus updated as new information becomes available based on experience. The knowledge base 12 is shared by all the regional centers and so is applied world wide, or may be regionalized.

Figure 5:
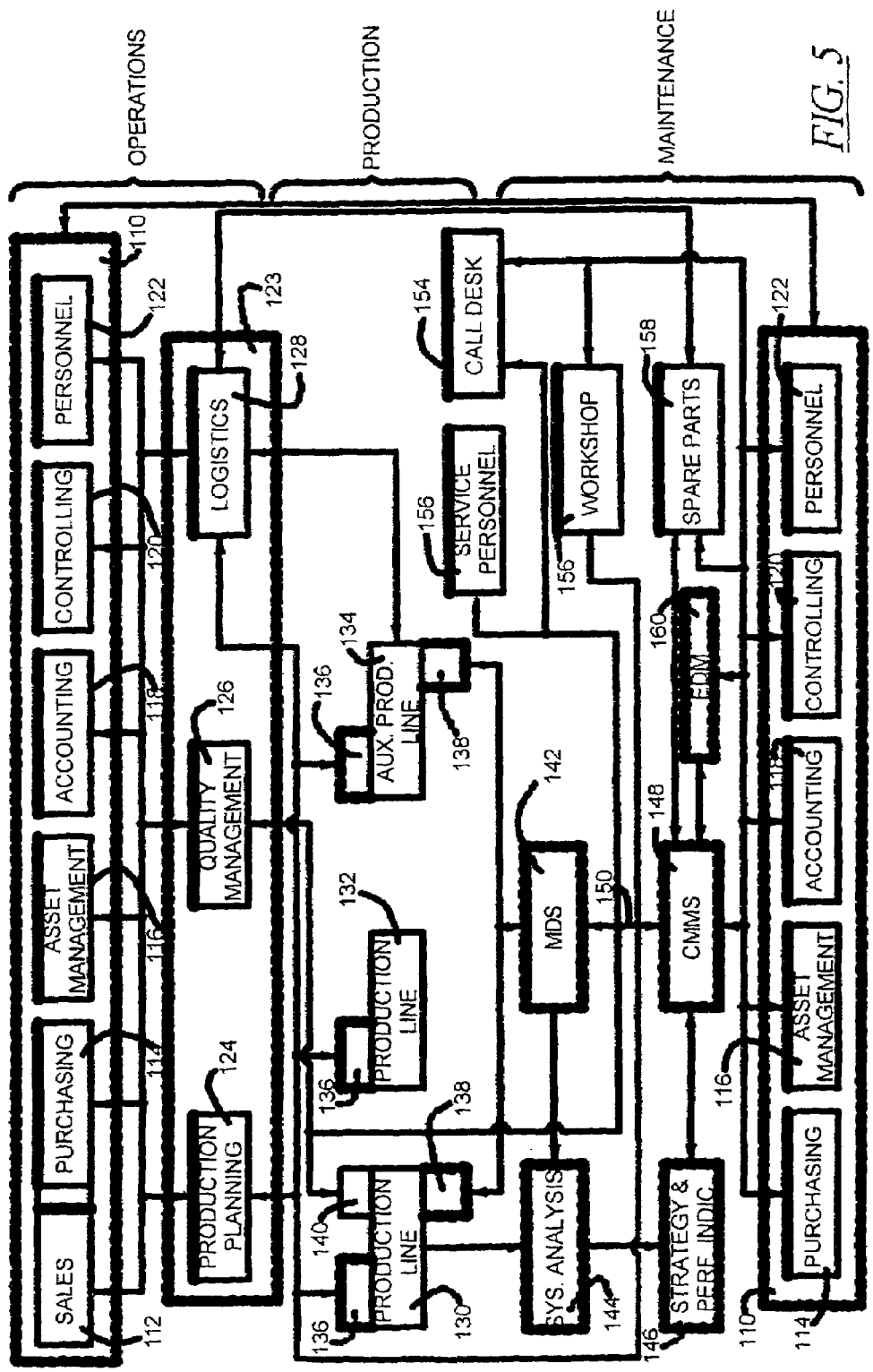
FIG. 5 is a block diagram of the information flow in the maintenance project at a plant.

The information model (data flow model) is shown in FIG. 5 for the present invention within a plant, such as plant 16. In particular, the plant is divided into operations, production and maintenance portions. The illustrated plant may include the entire plant, or may be just a portion of the plant to which the present maintenance services are provided. In the plant operations portion is found a block for enterprise resource planning 110, that includes the functions of sales 112, purchasing 114, asset management 116, accounting 118, controlling 120 and personnel 122 The enterprise resource planning 110 is shown in dotted outline to indicate that this functional element of the plant is, or may be, in communication with the knowledge base 12, such as through a regional center 28 and is thus supported by the present maintenance services architecture.

In communication with all of the enterprise resource planning elements is a management portion 123 including production planning 124, quality management 126 and logistics 128. These elements of management are supported as well by the present invention and are on communication with the knowledge base 12 as shown by the dotted outline.

In the production portion of the plant, which represents the plants key competency, is found first and second production lines 130 and 132 and an auxiliary production line 134. The production lines each have a digital control system 136, which may be in communication with the knowledge base 12 according to the present invention. A condition monitoring system 138 is also provided for each production line, if applicable, which can be directly connected to the experts at the regional centers as shown by the dotted outline. A quality management component 140 is provided as well.

The maintenance portion of the plant is the heart of the services that may be provided on an outsourced basis under the present invention. The maintenance portion has a maintenance decision support component 142 in communication with the condition monitoring systems 138 of the productions lines. The maintenance decision support component 142 monitored by the knowledge base 12 as shown by the dotted outline. Information from the maintenance decision support component 142 is provided to a systems analysis component 144, also linked to the knowledge base under the present method, which in turn communicates with a strategy and performance indicator component 146. Information from the maintenance decision support component 142 is transmitted back and forth with a computerized maintenance management system 148 via a bus 150 that also communicates directly with the strategy and performance indicator component 146. The computerized maintenance management system 148 which may be in communication with the knowledge base 12 according to the present invention. The bus 150 provides communications with service personnel 152 and a maintenance call desk 154 as well as to a workshop 156 and to the production planning 124 and quality management 126.

The logistics component 128 communicates to a spare parts management component 158, that also is in communication with the computerized maintenance management system 148. Also in communication with the computerized maintenance management system 148 is an engineering data management component 160, that has a connection to the knowledge base 12. At the lower portion of the FIG. 5, the maintenance components have their own enterprise resource planning components 10 or share these functions with the operations portion of the plant, depending on company organization. The maintenance components are in communication with the components of the enterprise resource planning 110 components of purchasing 114, asset management 116, accounting 118, controlling 120 and personnel 122. In this instance, personnel include the people, the software and the logic of the plant.

The foregoing is intended as an example of a business organization and is not intended to be limiting to the business structure to which the present invention may be applied.

Figure 6:
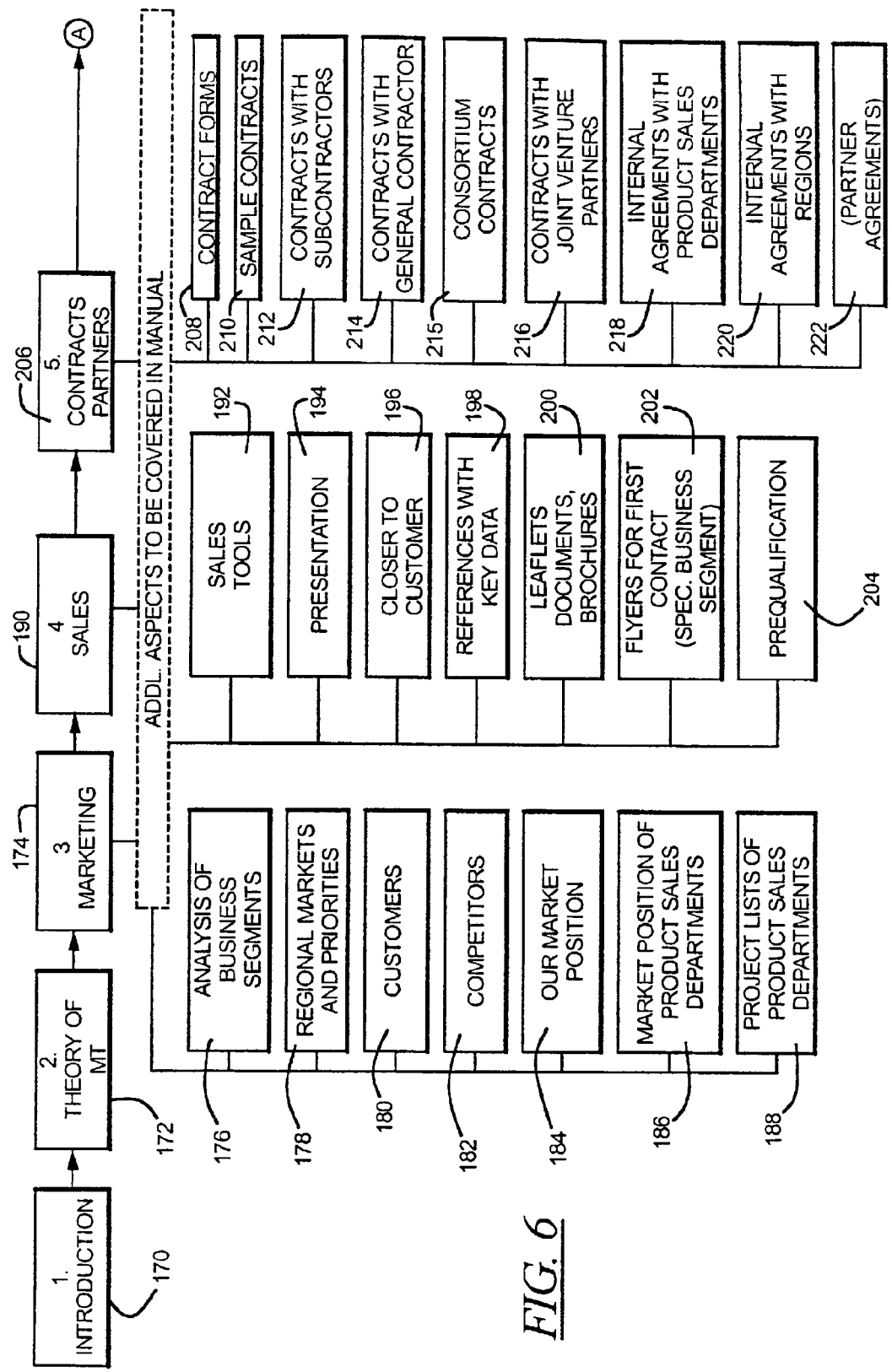
FIGS. 6 through 11 show multiple parts of a flow chart illustrating process steps set forth in the process description manual of the present invention.

Aspects of the process description manual 10 are shown in a flow chart of FIGS. 6, 7, 8, 9, 10, and 11. The flow chart represents information and guidelines in one embodiment of the manual and is not intended to limit the scope of the invention. In FIG. 6, a first portion 170 of the process manual is an introduction, followed by a section on the theory of management technology 172 and then a portion on marketing 174. Under the marketing portion 174 of the manual are parts relating to analysis of business segments 176, regional markets and priorities 178, customers 180, competitors 182, the plant's market position 184, the market position of the product sales departments 186 and a project list of product sales departments 188.

The next section of the process manual 10 relates to sales 190, including sales tools 192, presentation guidelines 194, proximity to customer 196, preference to key data 198, leaflets and brochures 200, fliers to first contacts 202, and prequalification 204. Under section 5 is found contract partners 206 for the maintenance services, which has the subsections of contract forms 208, sample contracts 210, contracts with subcontractors 212, contracts with general contractors 214, consortium contracts 215, contracts with joint venture partners 216, internal agreements with product sales departments 218, internal agreements with regions 220 and partner agreements 222.

Figure 7:
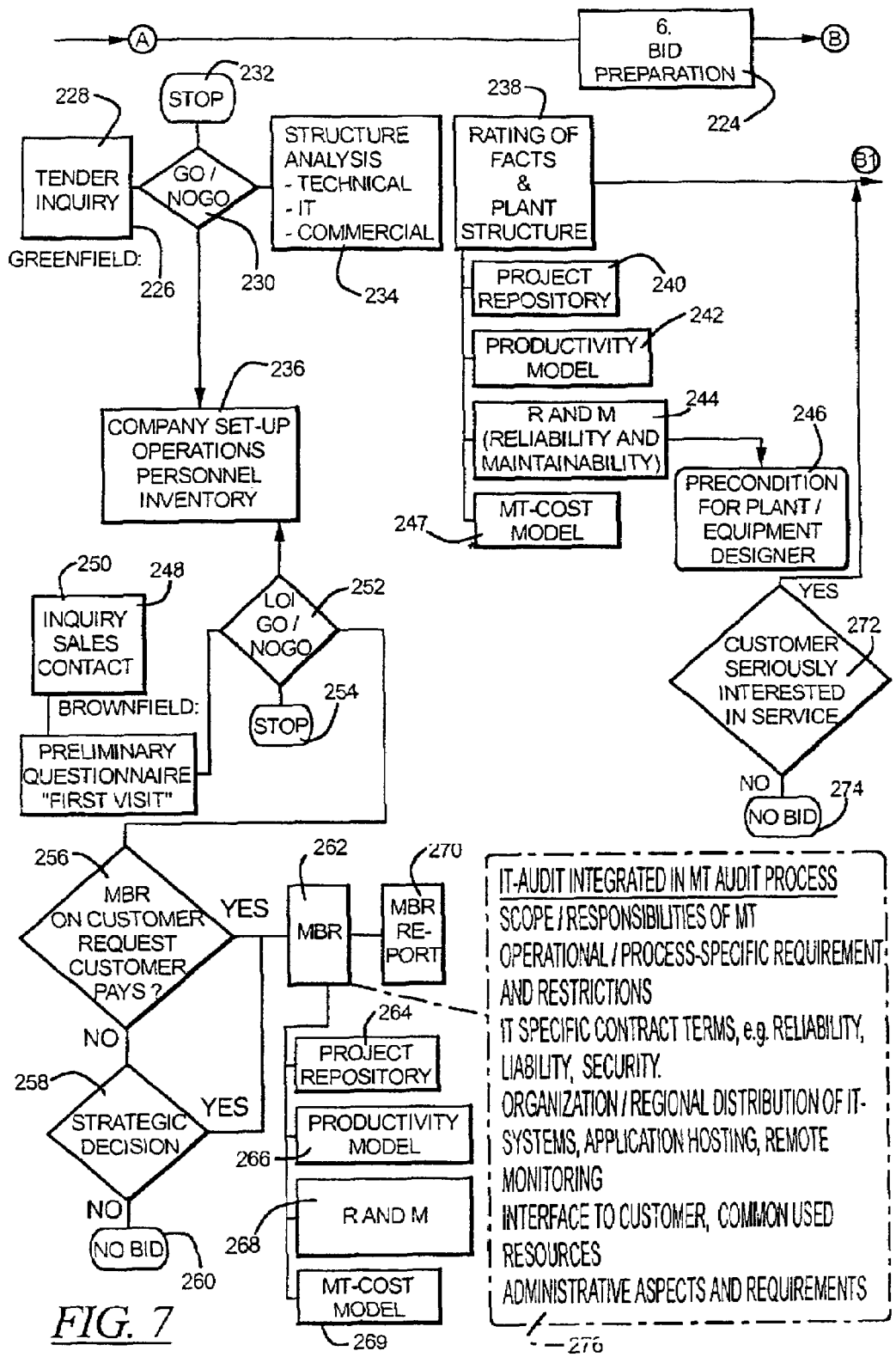

Turning to the continuation on FIG. 7, the manual 10 has a bid preparation section 224 for the plant. The entry point depends upon whether the plant is a greenfield plant (being built from the ground up) or brownfield plant (having an existing plant structure). The greenfield entry 226 provides for tender of an inquiry 228, and making a go/no go decision at 230. No go results in stop 232, while go results in performing a structural analysis of technical, information technology and commercial aspects at 234 as well as setting up of operations, personnel and inventory at 236. The structural analysis 234 leads to rating of the facts and plant structure 238, which includes a project repository 240 and a productivity model element 242 and reliability and maintainability 244 (which is optional), that lead to a preconditioning for the plant and equipment design 246. Also included is a maintenance cost model 247.

The brownfield entry 248 leads to a sales inquiry contract 250 (may be followed by a preliminary questionnaire in a first visit) and a go/no go decision 252, that is embodied in a letter of intent. No go results in stop 254, while go results in setting up of operations, personnel and inventory at 236 and performing an audit (a maintenance business review) MBR on customer request 256, leading to a strategic decision 258 that may result in no bid 260. The bid process continues with a maintenance technology audit 262, that includes a project repository 264, an reliability and maintainability element 266 (which is optional), a productivity model 268 and a maintenance cost model 269. Within the scope of the audit 262 is an audit or business review process, as indicated at 276, including identifying the scope and responsibilities of the maintenance, operational process-specific requirements and restrictions, information technology specific contract terms, such as relating to reliability, liability, security and the like. Additionally, organizational and regional distribution if information technology systems, application hosting and remote monitoring. A further aspect of the audit is interfacing to the customer and identifying commonly used resources. Lastly, administrative aspects and requirements are considered.

Following the maintenance business review 262, an MBR report, or maintenance business review report, 270 is prepared with conclusions and a proposal. Following that, a customer decision 272 is made as whether the customer is seriously interested enough to bid or not to bid. The no bid decision 274 ends the process.

Figure 8:
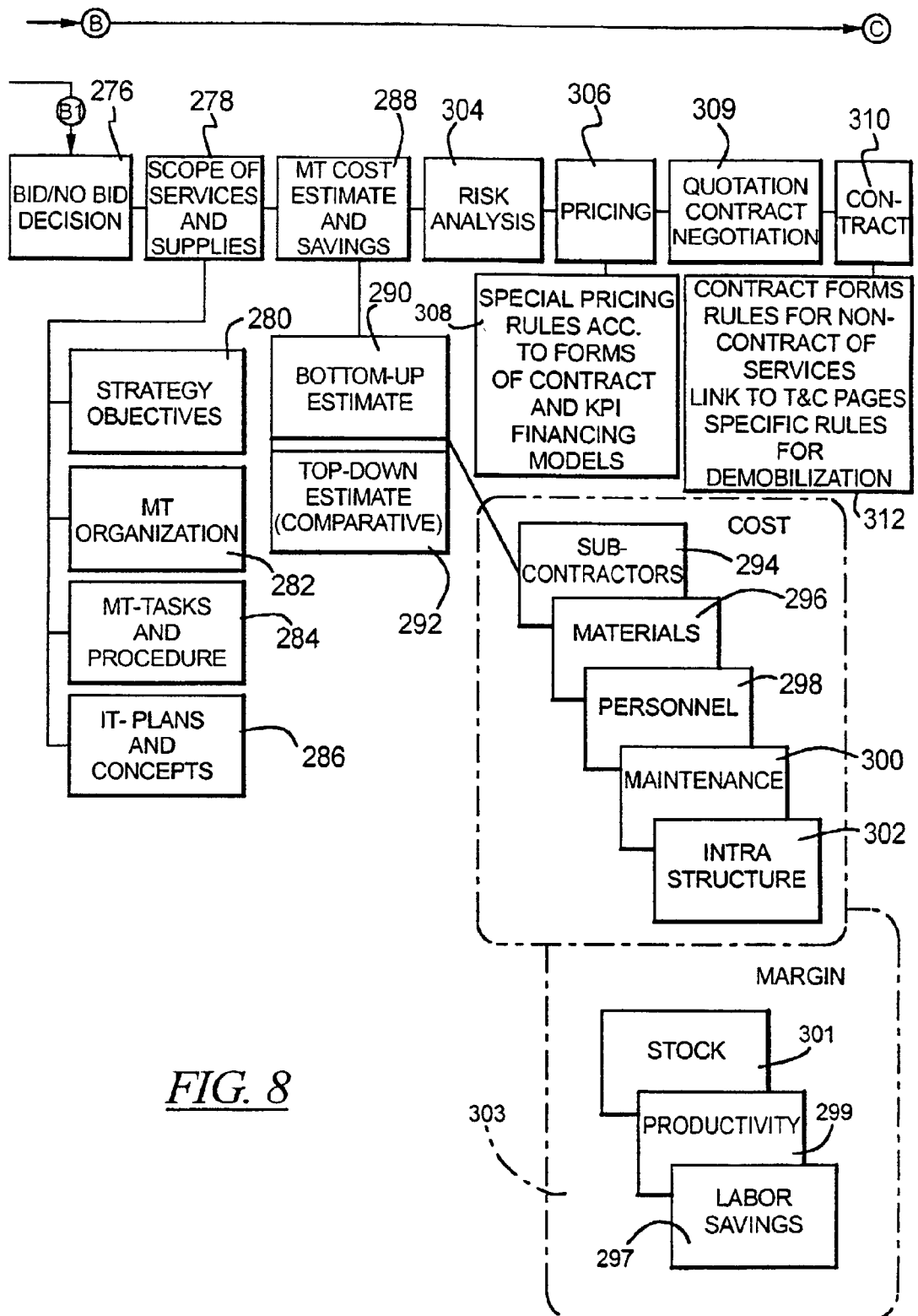

Additional features of the bid process are shown in FIG. 8. For example, a bid/no bid report 276 is made. This is followed by a determination of scope of the services and supply 278, that itself includes strategy and objectives 280, maintenance organization 282, maintenance tasks and procedures 284, and preparation of an information technology plan and concept 286. The process continues with a maintenance cost estimate 288. The cost estimate 288 may be either top down 290 or bottom up 292. Either way, the cost estimate is made based on costs after consulting with subcontractors 294, considering material costs 296, personnel costs 298, information technology costs 300 and infrastructure costs 302. A marginal cost consideration 303, that includes consideration of stock 301, productivity 299 and labor savings 297.

After a cost estimate is prepared, a risk analysis 304 is performed. This leads to pricing 306 of the project. The pricing is determined by specific pricing rules 308 according to the contract and key performance indicators. A quotation is offered and contract negotiations 309 commence. Finally, the contract 310 is prepared, using provided contract forms 312.

Figure 9:
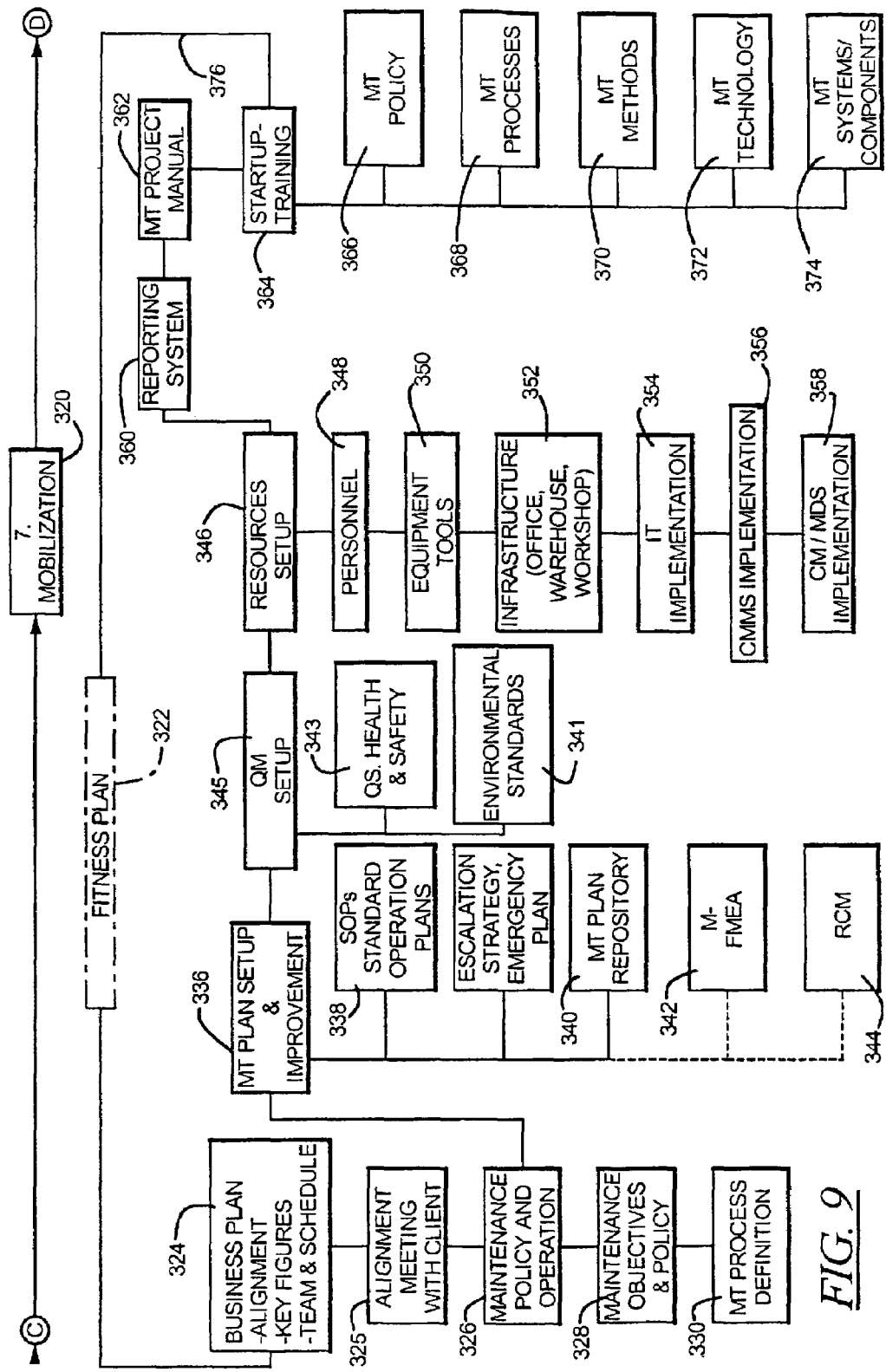

Following the bid process 224 is a mobilization process 320 as shown in FIG. 9. The mobilization includes a multi step fitness plan 322 for the plant. Some of the steps can be conducted concurrently. The first step of the fitness plan is a business plan 324, that includes elements of alignment, identification of key figures and preparation of a team and a schedule. The business plan is followed with alignment meetings 325 with the customer. The second step of the fitness plan provides a maintenance policy and operation plan 326, which includes the elements of identifying maintenance objectives and policy 328 and a maintenance process definition 330. In the next step, the maintenance plan is set up and improvements are made 336, including implementing standard operation plans 338, escalation strategy and emergency plans 339, establishing a maintenance plan repository 340, a machine failure mode and effects analysis (MFMEA) 342 and reliability centered maintenance (RCM) 344. The RCM can be ongoing process continuing beyond the mobilization phase. A quality maintenance setup step 345 is next, with quality, health and safety issues being addressed 343 and environmental standards review 341. After that, resources are set up 346, including assembling personnel 348, equipment and tools 350, infrastructure 352 such as an office, a warehouse and workshop, implementing information technology 354, implementing CMMS and implementing CM and MDS. A reporting system 360 is established as a further step, and lastly, a maintenance project manual 362 is prepared. The project manual 362 is used during the start up and training operations 364 of the plant, including training on maintenance policy 366, maintenance processes 368, maintenance methods 370, maintenance technology 372, and maintenance systems and components 374. This completes the fitness plan as outlined in the manual, as indicated by the embracing line 376.

Figure 10:
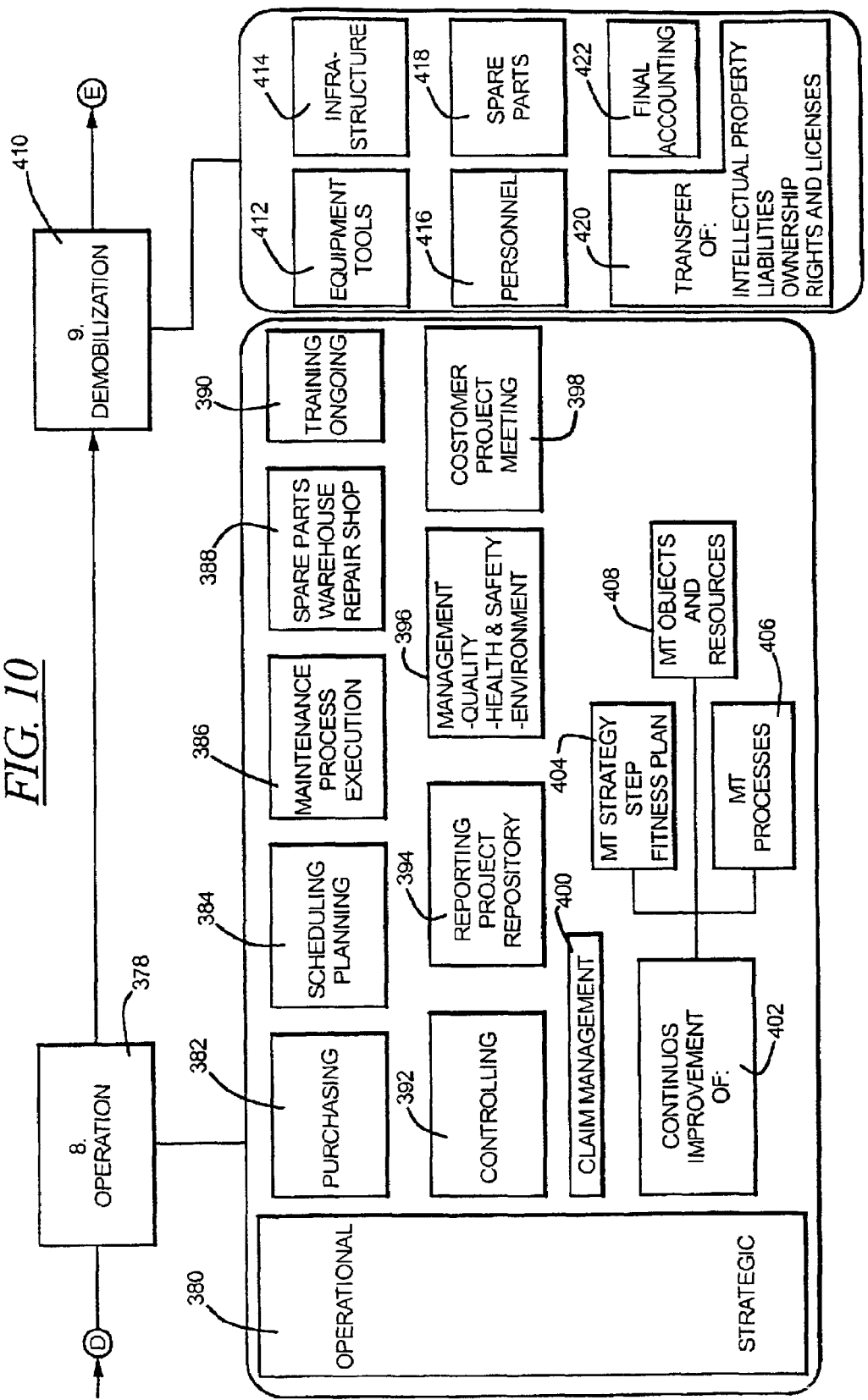

Operation of the plant is covered in section 8 of the process manual 10, as shown at 378 in FIG. 10. Areas addressed in the operations part of the process manual 10 are either more operational or more strategic, as indicated at 380, include purchasing 382, scheduling and planning 384, maintenance process execution 386, spare parts warehousing and operation of a repair shop 388, ongoing training 390, controlling 392, keeping up a reporting project repository 394, and management of quality, health and safety and environmental issues 396. A customer project meeting 398 may be conducted. These aspects all fall under the operational aspects. A further aspect of the operations is a strategic aspect, including a claim agent 400, providing continuous improvement 402 of the following processes a maintenance strategy with a multi-step fitness plan 404, the maintenance processes 406 and the maintenance objectives and resources 408.

Once the plant is to be shut down or the maintenance contract ends, the manual 10 covers demobilization 410 in section 9. This includes considering equipment and tools 412, infrastructure 414, personnel 416 and spare parts 418, as shown in FIG. 10. Another aspect of the demobilization is transfer 420 of intellectual property, of liabilities, of ownership rights and licenses. Lastly, a final accounting 422 is made.

FIG. 11 shows further aspects of various issues addressed in the process manual 10. The left most column relates to classes of information while the corresponding rows extending to the right is the information in that class. First is key maintenance processes 424, such as corrective maintenance 426, preventative maintenance 428, condition-base maintenance 430, trouble shooting 432 utilizing a failure reaction and corrective action system, a continuous improvement process 434 and life cycle management 436. The methods 438 utilized according to the manual include: machine failure mode and effects analysis and failure tree analysis 440, life cycle analysis 442, operational analysis 444, reliability centered maintenance 446, root cause failure analysis 448, balanced score cards 450 and maintenance process simulation 452. Various models 454 are used, including a multi-step fitness plan 456, a cost model 458, a productivity model 460, a manufacturing system model 462, and industry specific plant process diagrams 464. Within the information technology framework 466 is applied information models 468, information technology integration and interfacing 470, and teleservices 472 (which include personal heads-up displays as guides to local maintenance personnel). Reporting 474 aspects include reporting of key performance indicators 476, and industry specific benchmarks 478. In the projects repository 480 is provided a project scorecard 482, maintenance plans for subsystem equipment 484, processes 486, methods 488, models 490 and metrics 492. A portion directed to contracting partners 494 is provided as well, which is broken down to centers of excellence 496, internal experts 498 and external experts 500.

Figure 12:
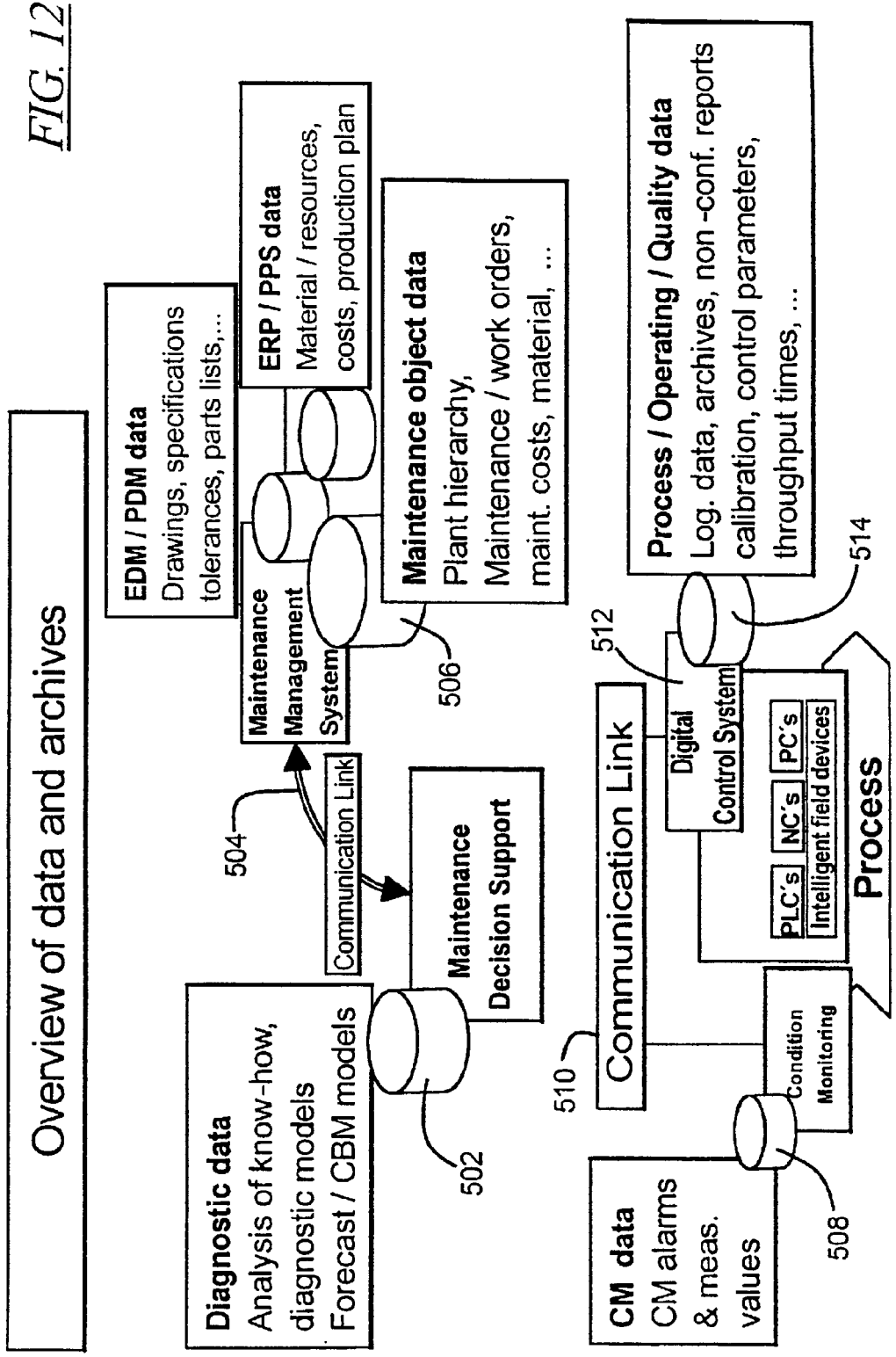
FIG. 12 is a functional element diagram of an architecture of the knowledge database.

Referring now to FIG. 12, an overview of data and archives in the knowledge database 12 is shown including a store 502 of diagnostic data for analysis of know-how, diagnostic models, forecasting and cost/benefit models. This provides maintenance decision support. A communications link 504 to a maintenance management systems store 506 with EDM/PCM data for drawings, specifications, tolerances, parts lists, etc., ERP/PPS data with materials and resources costs, and a production plan and maintenance object data with plant hierarchy, maintenance and work orders, maintenance costs, materials, and the like. Condition monitoring data storage 508 is linked through another communication link 510 to digital control systems 512 which perform processes on data at 514 such as process, operating and quality data, log, data, archives, non-conforming reports, calibration, control parameters and throughput times. These processes are performed using various computers, including network computers and personal computers.

Figure 13:
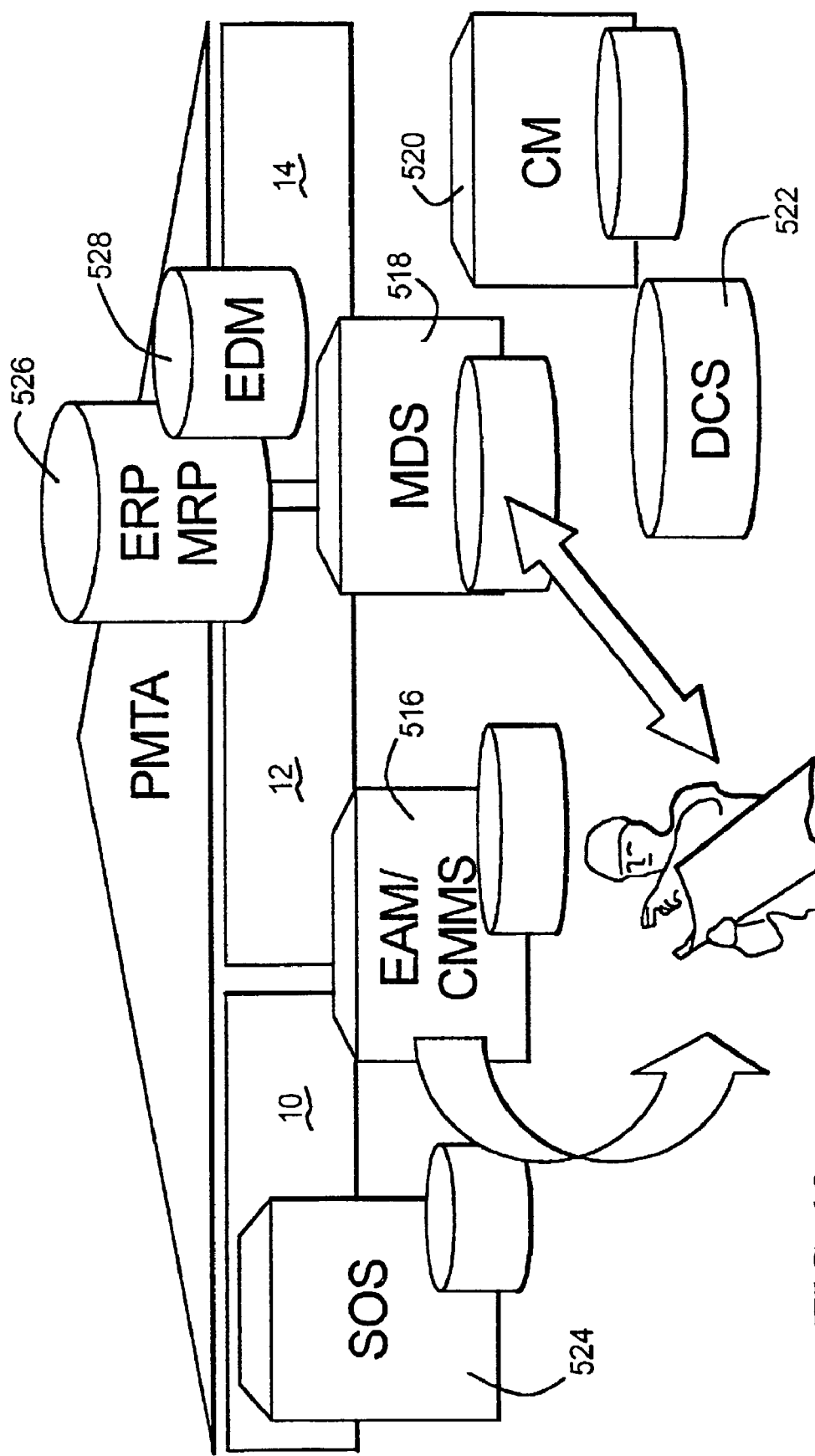
FIG. 13 is a functional element diagram of the software tool sets utilized in the present invention.

FIG. 13 shows the software tools utilized according to the present invention. Plant maintenance technology architecture includes as components computerized maintenance management systems (CMMS) 516, maintenance decision support (MDS) 518, conditioned monitoring systems (CM) 520, digital control systems (DCS) 522, and strategy optimization systems (SOS) 524. In additional, it utilizes enterprise resource planning (ERP), and manufacturing resource planning (MRP) 526 and engineering data management (EDM) 528.

Referring to FIG. 14, information technology integration and software standards are decisive as competitive factors in industry. The present invention provides an integration framework 530 linking standard software and enterprise resource planning 532 at the management level and to software 534 at the automation level through a planning level and a command level. Reliance on individual software 536 and on hardware 538 is reduced. Information technology influence 540 is driven top down from the management level while technology influence 542 is driven upward from the field level. Consistent standards and ease of use are realized. This is a substantial improvement over the past wherein various applications 544 were used at the management level and communicating with individual software 546 at the automation level that in turn was based on hardware 548. An intermediary step has begun to be used which attempts to link standard management software 550 to standard automation software 552 via overlapping partial solutions 554. Neither of these lead to the consistent standards and ease of use of the present invention.

Thus, plant maintenance technology architecture meets its objectives of creation of standardized procedures and reference processes and the development of assessment models as a decision basis for business based maintenance. It defines, structures and implements the frame-work for methodological knowledge acquisition. Further it provides an integration concept for universal and global information technology support. The plant maintenance technology architecture is formulated to meet market demands with trend setting factors including shareholder value increases due to cost awareness, increases in consequential shut down costs, increases in the volume of safety, environmental and certification instructions. Customers expect global and standardized services. Factors which are critical to success include process analysis and plant know-how, a network of maintenance competence, pooling of resources, standardized maintenance methodology, and cross sector best practices. This leads to increased customer benefit. In-house maintenance is decreased while outsourced business based maintenance is increased.

In summary, the concept behind plant maintenance technology architecture is to provide an umbrella under which is offered methods and processes, knowledge based business processes, and knowledge based technical processes. Underlying these is integration which uses standards and innovative information technology solutions and provides global, consistent and uniform provision of information. The methods and processes offer a design of a uniform maintenance process, establishment of standards for globally applicable methods and reference processes, and development of assessment models both in the technical and in the commercial sense. Such development may include life cycle costs. The knowledge based business processes implement asset management concepts, target maintenance strategy definitions and implementations, collect and consolidate existing know-how, and derive best practices from business and maintenance processes. The knowledge based technical processes offer increased productivity of plants, systematic utilization of plant know-how, modules for decision support, and performance monitoring.

The methods and processes portion define and harmonized the plant maintenance technology architecture. Process descriptions for definition of the maintenance programs and applications of method are offered. Definition of reference processes and cost models are utilized as standards. A determination of key metrics are made for process evaluation. A process module for systematic acquisition and dissemination of the know-how is available. The creation of an internal communication and training concept is also applied.

The knowledge based business processes offer scalable solutions for asset management in accordance with the relevant requirements. Establishment of a score card-based optimization system for maintenance strategy is done. Implementation and transfer of the strategy results to the operative management system using computerized maintenance management systems is accomplished. Know-how generation modules for a strategic performance differentiation are provided in addition to a leading competitive edge through certified maintenance management. The knowledge based technical processes offer total productive maintenance and optimization of the plants based on continuous improvement processes. On-line performance monitoring of the plants is offered. The development of a maintenance decision support methods and modules for diagnosis, optimization and residual life estimation are offered. An integration of existing databases containing descriptions of the product, system or plant behavior are available for technical modeling. For example, these relate to wear models. For a commercial condition monitoring, preparation of an evaluation model and competence structure is provided.

Integration of all of the foregoing is accomplished through development of a plant maintenance technology information model, taking standards and strategic system platforms into account. Evaluation of and active support of important standardization activities are accomplished in the maintenance system. Innovative technologies for teleservice and virtual team support are provided. Effective mechanism for experience exchange and knowledge management are installed. And lastly, piloting of methods and solutions modules with selective customers is performed. Each of these is accomplished by repeated reference to a manual of procedures.

The plant maintenance technology architecture is built on a pyramid, the base of which is provided by the knowledge base which is overlaid with the methods and tools and processes and topped off by the process manual. The customer who purchases maintenance services realizes improved bottom line results after implementing the present invention. In particular, plant availability is matched to the market demands while maintenance costs per goods produced are reduced. Strategic knowledge advantages are realized through outsourcing of the maintenance services.

For the provider of the maintenance services, more effective customer care and acquisition is provided, along with more efficient performance of maintenance services through access to comprehensive business and maintenance process descriptions, and through integrating tool-sets and learning experiences into a database.

INDUSTRIAL APPLICABILITY

The present invention finds industrial applicability in utilization to offer maintenance services to industrial plants, for instance.

Although other modifications and changes may be suggested by those skilled in the art, it is the intention of the inventors to embody within the patent warranted hereon all changes and modifications as reasonably and properly come within the scope of their contribution to the art.

We claim:

1. A computer-implemented architecture for providing maintenance services by performing a method of aligning maintenance policies to business objectives of a customer, comprising the steps of:
    (a) building a facility maintenance repository of historical data including performing a collection of business and maintenance processes of a facility to produce a historical assessment of a potential customer's facility, wherein the historical assessment identifies specific hardware equipment and software and site maintenance requirements and is related to technical services at the facility;
    (b) determining processes utilizing the specific hardware equipment and software identified in (a) above, and performing a criticality analysis that categorizes the processes as either critical or non-critical based on the impact a failed process has on the operation of the customer's facility;
    (c) performing a component identification of specific components that constitute the equipment utilized in the critical processes identified above;
    (d) analyzing the failure modes of the components identified in (c) above and determining which analytical technique or combination of analytical techniques is necessary to predict a technical system or component failure;
    (e) proposing an outsourced technical and maintenance services package, wherein the outsourced technical and maintenance services package includes providing a presentation manual for presenting information on the maintenance services being proposed, said manual being based on the historical data of the customer's facility and on historical data of comparable facilities of others and on predictions of technical system and component failure; wherein the outsourced maintenance package is based on providing maintenance support necessary for successful operation of the critical processes identified in (b) above
    (f) establishing agreement with the potential customer to provide maintenance according to the outsourced maintenance package of step (e) above;
    (g) providing maintenance at the customer's facility according to the agreement of (f);
    (h) further providing 24 hours a day, 7 days a week remote support by utilizing regional facilities that are located in at least three geographic regions around the world such that the regional facilities are staffed during normal daytime business hours; wherein the remote support provides the following services to the customer facility:
        (1) providing on call support of expert advice; wherein the expert advice is provided by the regional facilities based on the information contained in a knowledge database; wherein the knowledge database utilizes historical information based on other, similar industrial facilities or components
        (2) providing remote condition monitoring of the components identified in (c) utilizing at least one of the analytical techniques identified in (d); wherein the remote condition monitoring is further enhanced utilizing the knowledge database;

(i) benchmarking the customer facility's key performance indicators against comparable other facilities to improve the performance of the maintenance provider against the benchmark.

2. The method of claim 1, further comprising the steps of: providing a single headquarters location; and providing Internet connections between said single headquarters location and said regional facilities.

3. The method of claim 1, wherein said regional facilities are provided for at least three regions, said three regions being: the Far East, the European Union and a NAFTA country.

4. The method of claim 1, wherein said regional facilities supervise manpower requirements for said customer's facility.

5. The method of claim 2, further comprising the steps of transferring program modules from said regional facilities to said customer's facility through said Internet connections.

6. The method of claim 2, further comprising the step of: providing supervisory control of technical services at said customer's facility from said regional facility through said Internet connections.

7. The method of claim 1, wherein said customer's facility is an airport.

8. The method of claim 1, wherein said customer's facility is a power plant.

9. The method of claim 8, wherein said power plant is one of: a fossil fuel plant, an atomic energy plant, and a hydroelectric power plant.

10. The method of claim 1, wherein said outsourced maintenance package further includes providing human resources support to said customer facility.

11. A computer-implemented architecture as claimed in claim 1, wherein the manual takes product-specific bits of information and plant-specific bits of information from experience databases from worldwide plants having a same production target as said facility and the same production methods as said facility.

12. The method of claim 1, wherein said outsourced maintenance package further includes providing maintenance training to personnel based at said customer's facility.

13. A method for providing maintenance services to plants, comprising the steps of:
maintaining a plurality of plants on an outsourced basis;
defining and implementing methods and tool systems to deliver value-added and integrated plant maintenance;
collecting operative business and maintenance processes in a comprehensive and merged description as a manual;
using guidelines and an architecture for selecting and integrating software and hardware tools and resources to perform the process steps outlined in the manual, said resources including consultants and cooperation partners;
identifying and providing best-in-class software as said software;
using an experience database as a knowledge base that includes data tools and people which are consulted either occasionally or constantly for guidance, said knowledge base includes at least one of data from project experience, regional business information, data relating to technical equipment, and cost models, said knowledge base including a plant maintenance repository of historical data of at least one plant;
consulting the knowledge base for predictions of plant events, system and component failure modes and events for said at least one plant;
using modules which are implemented through software and hardware, installing said modules at a local level in each of said plurality of plants;
operating and controlling the service through regional facilities that are linked to the at least one plant by a communication connection, said regional facilities being provided at regions around the globe, said regional centers being locate in the Far East, in the European Union, and in a NAFTA country, said regional centers being open during ordinary business hours so as to offer 24 hour support to the at least one plant;
providing written strategy and methods, understanding of know-how based on business processes and know-how based on technical processes, and integration and piloting to said at least one plant
utilizing said software and said hardware in combination together with said manual and said knowledge base to yield optimum financial results for said at least one plant.

14. A method as claimed in claim 13, wherein said at least one plant is one of an airport, steel mill, hospitals, mine, ship yard, large building, hotel, chemical plant, cement plant, subway system, railway system, container terminal, oil drilling rig or platform, paper mill, oil or natural gas pipeline system, lime plant, water treatment plant including desalination, fresh water pipelining and waste water treatment, and food service facility.

* * * * *